US010422520B2

(12) United States Patent
Jurik et al.

(10) Patent No.: US 10,422,520 B2
(45) Date of Patent: Sep. 24, 2019

(54) LAMP COLOR TEMPERATURE STABILITY IN AN AUTOMATED LUMINAIRE

(71) Applicants: Robe Lighting s.r.o., Roznov pod Radhostem (CZ); Pavel Jurik, Prostredni Becva (CZ); Josef Valchar, Prostredni Becva (CZ)

(72) Inventors: Pavel Jurik, Prostredni Becva (CZ); Josef Valchar, Prostredni Becva (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 15/516,398

(22) PCT Filed: Oct. 1, 2015

(86) PCT No.: PCT/US2015/053560
§ 371 (c)(1),
(2) Date: Apr. 1, 2017

(87) PCT Pub. No.: WO2016/054413
PCT Pub. Date: Apr. 7, 2016

(65) Prior Publication Data

US 2018/0149347 A1 May 31, 2018

Related U.S. Application Data

(60) Provisional application No. 62/058,551, filed on Oct. 1, 2014.

(51) Int. Cl.

| | |
|---|---|
| ***F21V 29/61*** | (2015.01) |
| ***H05B 41/288*** | (2006.01) |
| ***H05B 41/292*** | (2006.01) |
| ***F21V 29/67*** | (2015.01) |
| ***F21V 3/00*** | (2015.01) |
| ***H01J 61/073*** | (2006.01) |
| ***H01J 61/52*** | (2006.01) |

(Continued)

(52) U.S. Cl.
CPC ................ *F21V 29/61* (2015.01); *F21V 3/00* (2013.01); *F21V 29/673* (2015.01); (Continued)

(58) Field of Classification Search
CPC ...... F21V 29/61; F21V 29/673; F21V 29/677; H05B 37/0281; F21W 2131/406
See application file for complete search history.

(56) References Cited

U.S. PATENT DOCUMENTS 6,621,239 B1 * 9/2003 Belliveau ........... H05B 33/0854 315/112
6,664,745 B2 * 12/2003 Belliveau ............. H04N 9/3141 315/315

(Continued)

FOREIGN PATENT DOCUMENTS

CN 103890489 A 6/2014
EP 2034357 A1 3/2009

(Continued)

OTHER PUBLICATIONS

PCT International Search Report; Application No. PCT/US2015/053560; dated Mar. 8, 2016; 5 pages.

(Continued)

*Primary Examiner* — Douglas W Owens
*Assistant Examiner* — Pedro C Fernandez
(74) *Attorney, Agent, or Firm* — Conley Rose, P.C.; Grant Randolph; Brooks W Taylor

(57) ABSTRACT

Described is dynamic control of the temperature of the envelope of an HID lamp in order to stabilize the output color temperature of the lamp. As the lamp power is changed, or environmental factors alter the lamp envelope temperature, the system senses these changes and adjusts the lamp cooling systems so as to move the lamp envelope temperature back to the desired point.

17 Claims, 3 Drawing Sheets

(51) Int. Cl.

*H01J 61/56* (2006.01)
*H05B 37/02* (2006.01)
*H05B 41/36* (2006.01)
*H05B 31/00* (2006.01)
*F21W 131/406* (2006.01)

(52) U.S. Cl.

CPC .......... *F21V 29/677* (2015.01); *H01J 61/073* (2013.01); *H01J 61/52* (2013.01); *H01J 61/56* (2013.01); *H05B 37/0281* (2013.01); *H05B 41/2881* (2013.01); *H05B 41/2928* (2013.01); *H05B 41/36* (2013.01); *F21V 29/67* (2015.01); *F21W 2131/406* (2013.01); *H05B 31/0066* (2013.01)

(56) References Cited

U.S. PATENT DOCUMENTS

2007/0200955 A1 8/2007 Harada et al.
2009/0046255 A1 2/2009 Kato
2010/0118279 A1 * 5/2010 Itsuki .................... G03B 21/16 353/54

FOREIGN PATENT DOCUMENTS

WO 2008083697 A1 7/2008
WO 2013036538 A1 3/2013

OTHER PUBLICATIONS

PCT Written Opinion of the International Searching Authority; Application No. PCT/US2015/053560; dated Mar. 8, 2016; 8 pages.
European Examination Report; Application No. 15820913.0; dated May 29, 2018; 5 pages.
Chinese Office Action; Application No. 201580065384.8; dated Nov. 5, 2018; 13 pages.
Chinese Notice of Allowance; Application No. 201580065384.8; dated May 20, 2019; 5 pages.
European Intention to Grant; Application No. 15820913.0; dated Apr. 26, 2019; 7 pages.

* cited by examiner

LAMP COLOR TEMPERATURE STABILITY IN AN AUTOMATED LUMINAIRE

RELATED APPLICATION

Cross-Reference to Related Applications

This application is a filing under 35 U.S.C. § 371 of International Application No. PCT/US2015/053560 filed Oct. 1, 2015 entitled, Improved Lamp Color Temperature Stability in an Automated Luminaire", which claims priority to U.S. Provisional Application No. 62/058,551 filed on Oct. 1, 2014 entitled, "Improved Lamp Color Temperature Stability in an Automated Luminaire".

TECHNICAL FIELD OF THE DISCLOSURE

The present disclosure generally relates to the control of the color temperature of a lamp, and more specifically to the color temperature of a high intensity discharge lamp as utilized in an automated luminaire.

BACKGROUND

Luminaires with automated and remotely controllable functionality are well known in the entertainment and architectural lighting markets. Such products are commonly used in theatres, television studios, concerts, theme parks, night clubs, and other venues. A typical product will commonly provide control over the pan and tilt functions of the luminaire allowing the operator to control the direction the luminaire is pointing and thus the position of the light beam on the stage or in the studio. Typically, this position control is done via control of the luminaire's position in two orthogonal rotational axes usually referred to as pan and tilt. Many products provide control over other parameters such as the intensity, color, focus, beam size, beam shape, and beam pattern. FIG. 1 illustrates a typical multiparameter automated luminaire system 10. These systems typically include a plurality of multiparameter automated luminaires 12 which typically each contain on-board a light source (not shown), light modulation devices, electric motors coupled to mechanical drive systems, and control electronics (not shown). In addition to being connected to mains power either directly or through a power distribution system (not shown), each automated luminaire 12 is connected in series or in parallel to data link 14 to one or more control desks 15. An operator typically controls the automated luminaire system 10 through the control desk 15.

To achieve the high brightness needed for such systems it is common to utilize High Intensity Discharge lamps (HID). Short and medium arc HID lamps produce light from a plasma cloud produced by an electrical arc that is maintained between two adjacent electrodes within a sealed quartz envelope. FIG. 2 shows an example of an HID lamp 30 that may be used. Electrodes 32 and 33 are enclosed within sealed quartz envelope 38 and connected by lead wire 35 to a base 36 and electrical connections 37. The HID lamps used in entertainment lighting luminaires often use very small arc gaps 34 between the two electrodes, of the order of 1 to 5 mm, to provide a low etendue light source that facilitates the design of a high quality optical system for projecting images and colors. The spectrum of light emitted by the lamp is produced by the ionization and emission of a mix of rare earths and gases that are contained within the envelope 38. The emission spectra of each of these components, when heated to the plasma temperatures of the arc, combine to produce an overall emission spectrum for the lamp. The lamp manufacturer carefully selects the mix of constituents for the lamp fill in order to produce a white light output with a spectrum that approximates to that of a black body emitter at the desired color temperature. For example, it is common to manufacture HID lamps with a target color temperature of 5600 Kelvin (K), or daylight. It is also common to produce lamps with target color temperatures of 3200 K, 7000 K, 10000 K, and other white points as commonly used in the entertainment lighting business for television cameras, film cameras, or a live audience.

A significant problem with such lamps is maintaining the stability of the desired target color temperature. Small changes in the arc gap, as the electrodes burn away, and fluctuations in the temperature of the lamp envelope can make significant changes to the precise mix of constituents that are emitting spectra to the combined spectrum. For example, as the temperature drops within the envelope then some constituents that emit specific wavelengths of light may drop out of the ionization cloud, or alter their output, thus affecting the resultant output spectrum and thus the output color temperature. Lamp manufacturers may attempt to mitigate this variability by enclosing the inner quartz envelope 38 within a second outer envelope (not shown) to provide rudimentary temperature control. However, such designs are still not stable and the color temperature may vary significantly.

It is also common to desire to change the power consumed by the lamp, in order to control its brightness. Unfortunately any change in lamp power also affects the operating temperature of the lamp that, in turn, will affect the output color temperature. Prior art systems have utilized fan cooling systems to attempt to stabilize the lamp temperature, but these have been ineffective and slow to operate, allowing large changes in the lamp output color temperature that were visible to the audience.

It would be advantageous to provide a system that was capable of providing continuous and dynamic control of the temperature of the envelope of an HID lamp in order to stabilize the output color temperature of the lamp.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION OF THE DISCLOSURE

Preferred embodiments of the present disclosure are illustrated in the FIGUREs, like numerals being used to refer to like and corresponding parts of the various drawings.

The present disclosure generally relates to the control of the color temperature of a lamp, and more specifically to the color temperature of a high intensity discharge lamp as utilized in an automated luminaire.

In one embodiment, the present disclosure utilizes a tightly temperature controlled enclosure 40 for the HID lamp in order to maintain the lamp envelope temperature within close tolerances and thus maintain the color temperature of the light output from the lamp within close tolerances.

Figure 1:
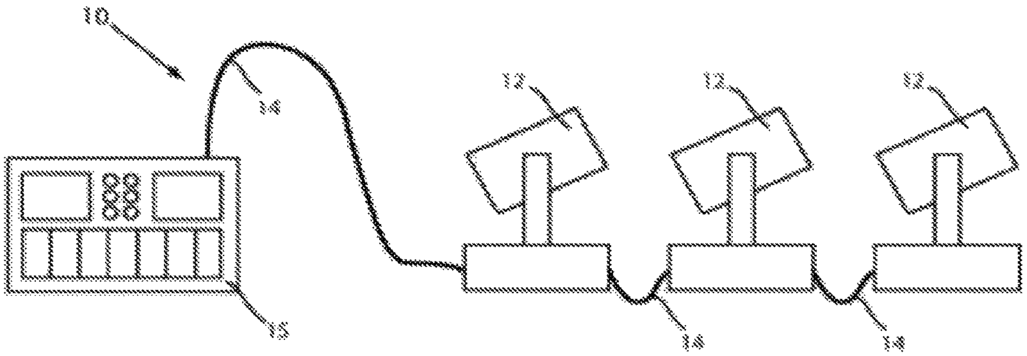
FIG 1 PRIOR ART
FIG. 1 illustrates a typical prior art automated lighting system.
Figure 2:
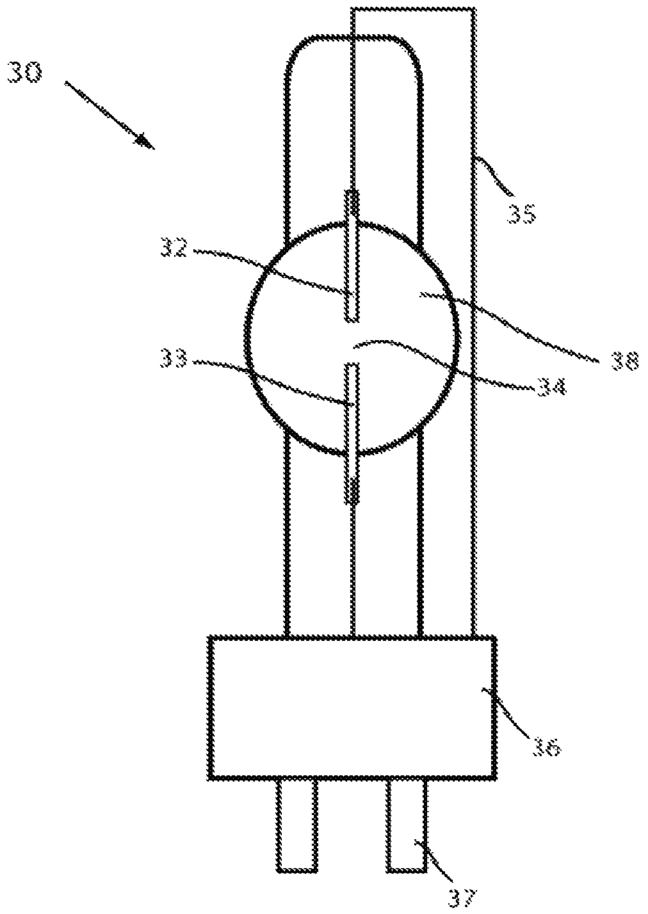
FIG 2 PRIOR ART
FIG. 2 illustrates a typical HID lamp.
Figure 3:
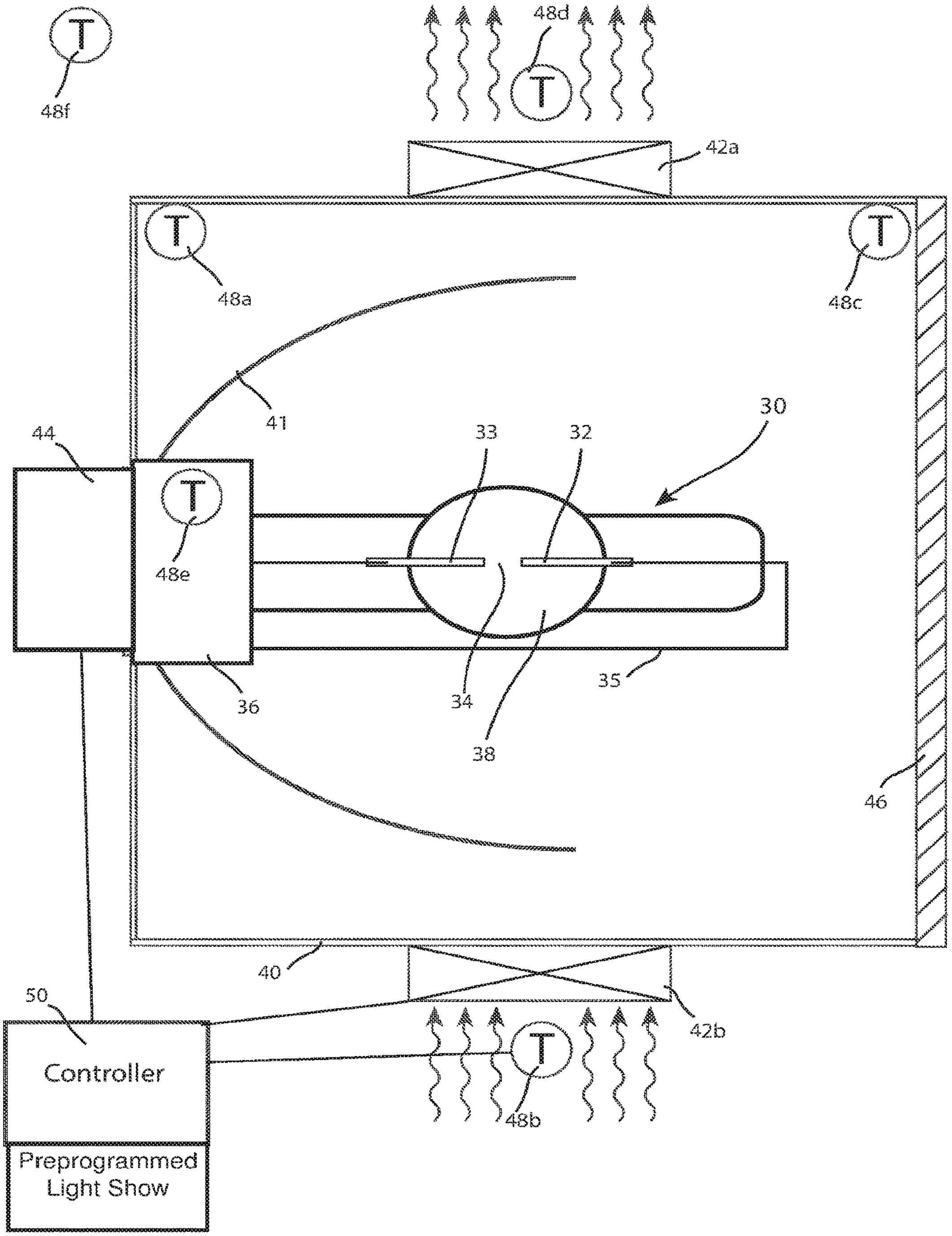
FIG. 3 illustrates an embodiment of the disclosure.

FIG. 3 illustrates one embodiment of the disclosure. High Intensity Discharge (HID) lamp 30 comprises electrodes 32 and 33 that are enclosed within sealed quartz envelope 38 and connected by lead wire 35 to a base 36. Base 36 may connect to lamp connector 44 from which electrical connections may be made to the control gear (not shown). In operation, an electrical arc is formed across arc gap 34 creating a localized region containing high temperature plasma. This plasma excites the mix of rare earths and gases that are contained within envelope 38 such that a distinctive light spectrum is emitted. The constituent spectra forming the light output spectrum are sensitive to the temperature of the envelope 38. HID lamp 30 is contained within enclosure 40, providing a controlled environment. Air may enter enclosure 40 through controllable fan or blower 42*b* and may exit the enclosure through controllable fan or blower 42*a*. Light from HID lamp 30 may be directed and controlled by reflector 41. One face of the enclosure 40 may be a transparent window 46 manufactured of a transparent material for the light from HID lamp 30 and reflector 41 to exit. Transparent window 46 may be planar, curved, faceted, or any shape as known in the art. Transparent window 46 may be glass, quartz, or other transparent material. Transparent window 46 may have coatings including but not limited to, dichroic hot mirror, colored dichroic, or heat resistant coatings.

Enclosure 40 may further comprise a plurality of temperature sensors 48*a*, 48*b*, 48*c*, 48*d*, and 48*e*. These temperature sensors are configured to read the temperature of critical points of the lamp, its enclosure, and the exiting and entering air. For example, temperature sensors 48*a* and 48*c* may measure the temperature at different points in enclosure 40. Temperature sensor 48*e* may measure the temperature of lamp base 36 or the lamp pinches. Temperature sensor 48*b* may measure the temperature of incoming air through controllable fan 42*b*, and temperature sensor 48*d* may measure the temperature of exiting air through controllable fan 42*a*. Additionally remote temperature sensors, such as 48*f*, may be utilized elsewhere in the luminaire as desired.

In operation all temperature sensors 48*a*-48*f* and controllable fans 42*a* and 42*b* are connected to and controlled by a central controller 50. In manufacturing and testing, controller 50 may be configured with knowledge of the configuration of enclosure 40, HID lamp 30, and the positions and parameters of temperature sensors 48*a*-48*f* and fans 42*a* and 42*b*. This knowledge includes the time constants of the various connected items, and the amount of time it takes to heat or cool lamp envelope 38 and lamp pinches as a function of lamp power, temperatures, and fan speeds. Algorithms in controller 50 may be configured so as to operate temperature control of enclosure 40, and thus lamp envelope 38, as a parameterized closed loop system such that all temperatures are monitored and fan speeds raised and lowered as needed to keep the temperature of lamp envelope 38 at a constant point.

The controller 50 has access to a programmed lighting show or lighting plan that includes the planned lamp power when the lamp is being dimmed or undergoing other activities that may affect envelope temperature as a function of time, such that it can pro-actively adjust fan speeds to allow for a predicted temperature change that will occur from any particular change in lamp power. For example, a particular lamp may be operated at 1700 Watts (W), 1500 W, 1200 W, 900 W or other wattage while maintaining a constant lamp temperature, and thus a constant light output color temperature. In other embodiments maintaining color temperature constant may require variation in the lamp temperature.

In a further embodiment the lamp may be configured to run at an extremely low power when the unit is shuttered or in blackout with no light emerging. In prior art products this led to a significantly lowered lamp temperature that, in turn, produced a much higher output color temperature. When the lamp was opened up from blackout and raised back to full power, this high color temperature was noticeable, as was the change in color temperature as the lamp warmed up, which was objectionable to the viewer or television camera. However, with the system of the disclosure, controller 50 may recognize the blackout condition and automatically lower fan speeds so that the lamp temperature remains at the correct level. Then, when the lamp is opened up from blackout the color temperature of the output light will be correct and stable.

In further embodiments of the disclosure different numbers and positions of temperature sensors are used.

A particular style of single ended HID lamp is illustrated in FIG. 3. The disclosure is not so limited and any style of lamp, single ended, double ended, integral reflector, and other lamp styles as known in the art could be used in an embodiment of the disclosure.

While the disclosure has been described with respect to a limited number of embodiments, those skilled in the art, having benefit of this disclosure, will appreciate that other embodiments may be devised which do not depart from the scope of the disclosure as disclosed herein. Accordingly, the scope of the disclosure should be limited only by the attached claims.

The disclosure has been described in detail, it should be understood that various changes, substitutions and alterations can be made hereto without departing from the spirit and scope of the disclosure as described by the appended claims

We claim:

1. An enclosure, comprising:

a light source within the enclosure;

one or more fans configured to control corresponding flows of air into or out of the enclosure;

one or more temperature sensors located within the enclosure and configured to monitor one or more corresponding temperatures inside the enclosure; and a controller coupled to the one or more fans and the one or more temperature sensors, and configured to proactively adjust one or more speeds of the one or more fans to maintain a constant light output color temperature, based on one or more of the temperatures monitored by the one or more temperature sensors and a temperature change predicted to result from a planned lamp power change in a preprogrammed light show.

2. The enclosure of claim 1, wherein the controller is configured to adjust the one or more speeds of the one or more fans to maintain a desired color temperature of light emitted by the light source.

3. The enclosure of claim 2, wherein the controller is configured with light source rate information relating to a heating or cooling rate of the light source to use in adjusting the one or more speeds of the one or more fans.

4. The enclosure of claim 3, wherein the light source rate information comprises the heating or cooling rate of the light source as a function of lamp power, temperatures monitored by the one or more temperature sensors, or speeds of the one or more fans.

5. The enclosure of claim 3, wherein the controller is configured with the light source rate information during one of a manufacturing or testing process.

6. The enclosure of claim 3, wherein the controller is configured to adjust the one or more speeds of the one or more fans based on information relating to one or more of a configuration of the enclosure, a configuration of the light source, positions or parameters of one or more of the one or more temperature sensors, or positions or parameters of one or more of the one or more fans.

7. The enclosure of claim 1, wherein the controller is configured to adjust the one or more speeds of the one or more fans based on a status of a luminaire comprising the enclosure.

8. The enclosure of claim 1, wherein three of the one or more temperature sensors monitor a temperature of air coming into the enclosure, a temperature of air exiting the enclosure, and a temperature of a base of the light source or lamp pinches of the light source.

9. The enclosure of claim 1, wherein the controller is configured to adjust the one or more speeds of the one or more fans to keep an envelope of the light source at a constant temperature.

10. An automated luminaire, comprising:

a light source;

an enclosure containing the light source comprising:

a transparent window configured to permit light emitted by the light source to exit the enclosure; and one or more fans configured to control corresponding flows of air into or out of the enclosure;

one or more temperature sensors located within the enclosure and configured to monitor one or more corresponding temperatures inside the enclosure; and a controller coupled to the one or more fans and the one or more temperature sensors, and configured to adjust one or more speeds of the one or more fans to maintain a constant light output color temperature, based on one or more of the temperatures monitored by the one or more temperature sensors and information relating to a planned lamp power in a preprogrammed light show, the controller further configured to recognize a blackout condition of the luminaire, reduce lamp power to the light source in response to recognizing the blackout condition, and lower one or more speeds of the one or more fans to maintain the constant light output color temperature during the blackout condition.

11. The automated luminaire of claim 10, further comprising a luminaire temperature sensor located within the automated luminaire and outside the enclosure, the luminaire temperature sensor configured to monitor a temperature within the automated luminaire, the luminaire temperature sensor coupled to the controller, and the controller configured to adjust the one or more speeds of the one or more fans additionally based on the temperature monitored by the luminaire temperature sensor.

12. The automated luminaire of claim 10, wherein the controller is configured to adjust the one or more speeds of the one or more fans to maintain a desired color temperature of light emitted by the light source.

13. The automated luminaire of claim 12, wherein the controller is configured with light source rate information relating to a heating or cooling rate of the light source to use in adjusting the one or more speeds of the one or more fans.

14. The automated luminaire of claim 13, wherein the light source rate information comprises the heating or cooling rate of the light source as a function of lamp power, temperatures monitored by the one or more temperature sensors, or speeds of the one or more fans.

15. The automated luminaire of claim 13, wherein the controller is configured with the light source rate information during one of a manufacturing or testing process.

16. The automated luminaire of claim 13, wherein the controller is configured to adjust the one or more speeds of the one or more fans based on information relating to one or more of a configuration of the enclosure, a configuration of the light source, positions or parameters of one or more of the one or more temperature sensors, or positions or parameters of one or more of the one or more fans.

17. The automated luminaire of claim 10, wherein the controller is further configured to proactively adjust one or more speeds of the one or more fans to maintain a constant light output color temperature when not in the blackout condition, based on one or more of the temperatures monitored by the one or more temperature sensors and a temperature change predicted to result from a planned lamp power change in a preprogrammed light show.

* * * * *